Nov. 30, 1954 — F. CARTLIDGE — 2,695,693
TORQUE-LIMITING CLUTCH
Filed July 18, 1951 — 2 Sheets-Sheet 1
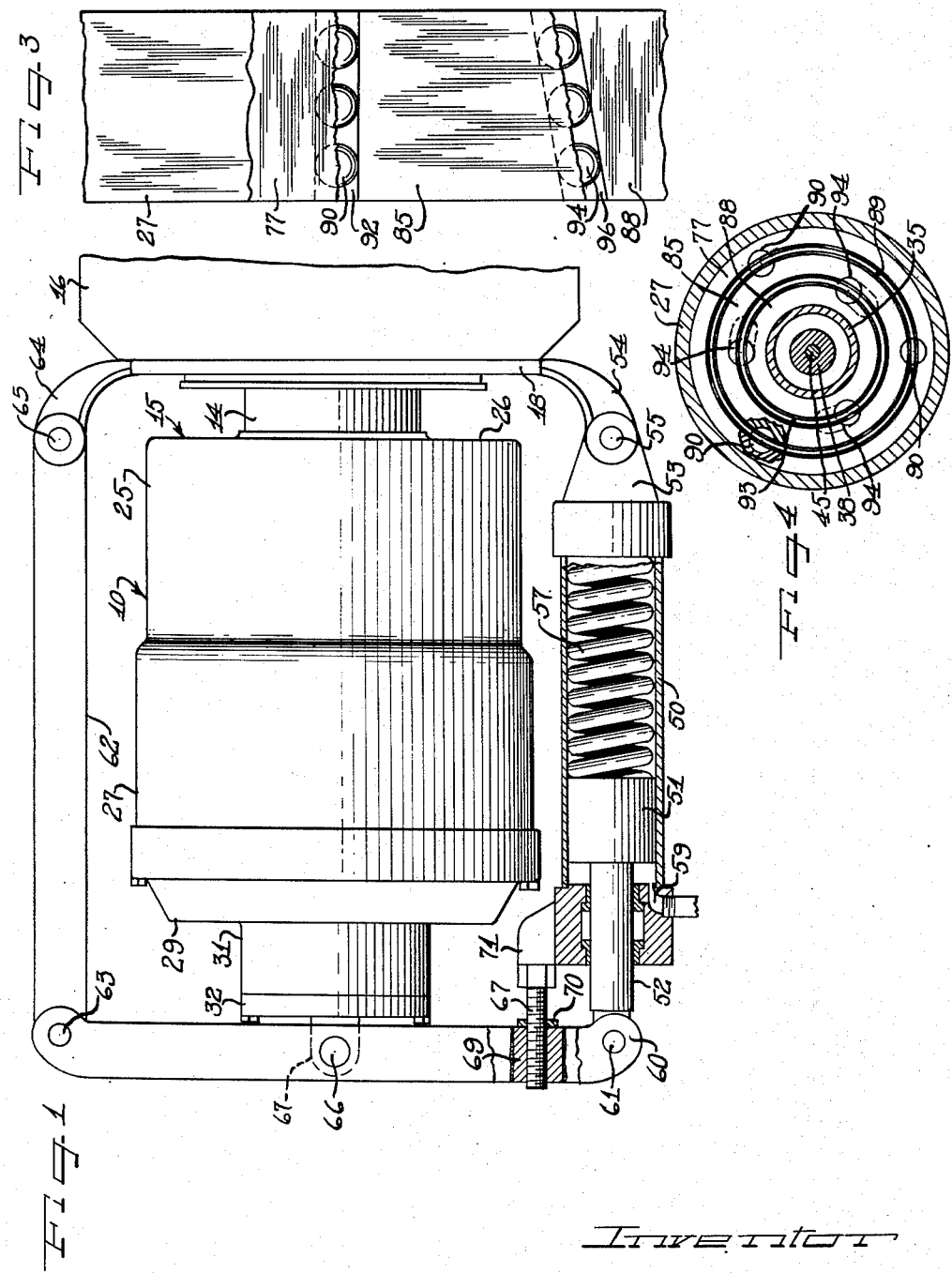
Inventor
Frank Cartlidge
Murray A. Gleeson Atty Nov. 30, 1954
F. CARTLIDGE
2,695,693
TORQUE-LIMITING CLUTCH
Filed July 18, 1951
2 Sheets-Sheet 2
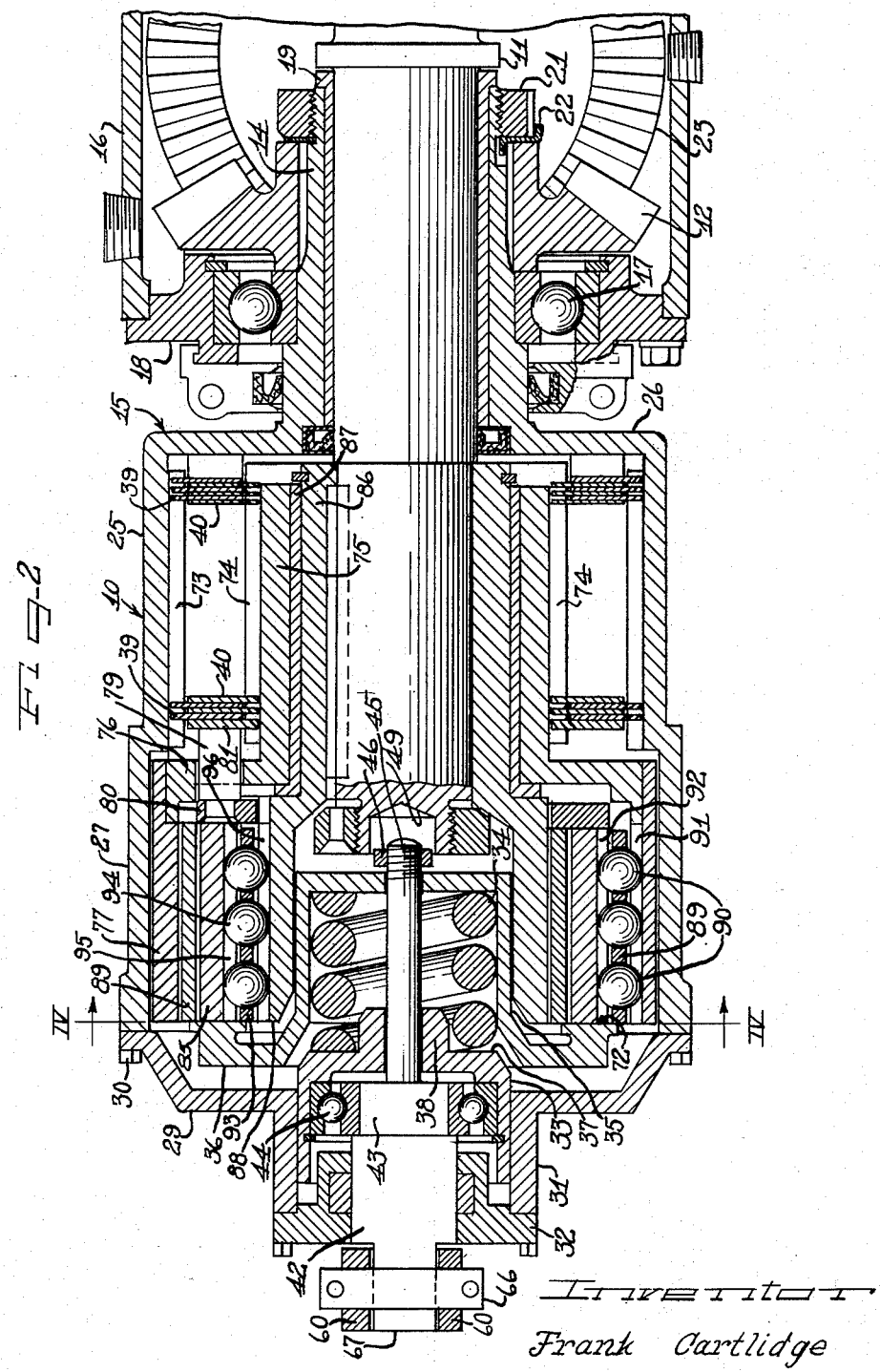
Inventor
Frank Cartlidge
by Murray G. Gleeson Atty

United States Patent Office 2,695,693
Patented Nov. 30, 1954

2,695,693

TORQUE-LIMITING CLUTCH

Frank Cartlidge, Chicago, Ill., assignor to Goodman Manufacturing Company, Chicago, Ill., a corporation of Illinois Application July 18, 1951, Serial No. 237,333

2 Claims. (Cl. 192—54)

This invention relates to improvements in clutches and more particularly relates to a simplified and improved form of torque-limiting clutch, releasable upon predetermined overload conditions.

An object of my invention is to provide a novel and improved form of torque-limiting clutch arranged with a view toward the utmost simplicity and ruggedness in construction, and dependability in operation.

Another object of my invention is to provide a novel form of torque-limiting clutch so constructed and arranged that friction may be disregarded as a factor in the operation and design of the releasing parts of the clutch and thus increasing the dependability of the clutch to release when predetermined overload conditions are reached.

Still another object of my invention is to provide a torque-limiting clutch for heavy duty service which is extremely rugged and simple in construction and accurately limits the transmitted torque through the clutch to the required predetermined overload value.

A further object of my invention is to provide a selectively operable load-limiting clutch of a simple and efficient construction, and effectively operable to relieve the overload conditions with a minimum of friction on the releasing parts of the clutch.

A further and more detailed object of my invention is to provide a novel and improved form of load-limiting clutch in which an intermediate clutch engaging member is interposed between driving and driven members and is driven from the driving member and drives the driven member and is free to float with respect to these driving and driven members in a direction to apply, or release the clutch depending upon the torque load thereon.

A still further and more detailed object of my invention is to provide a novel and improved form of torque or load-limiting clutch in which an annular member serves to engage the clutch, or to allow the clutch to slip and in which this annular member is driven from the driving and driven members of the clutch by means of balls carried in axially extending races, one set of races of which is offset with respect to the other, to react against the annular member in a direction to release the clutch when loaded, and in which this axial movement of the intermediate member in a release direction is spring-balanced by a spring loaded to the torque conditions required.

These and other objects of my invention will appear from time to time as the following specification proceeds and with reference to the accompanying drawings wherein:

Figure 1 is a plan view of a clutch constructed in accordance with my invention with certain of the operating mechanism therefor shown in section;

Figure 2 is a longitudinal sectional view taken through the clutch shown in Figure 1;

Figure 3 is a detailed fragmentary diagrammatic view illustrating the driving connection between the driving and driven members and the intermediate clutch-engaging member; and Figure 4 is a fragmentary sectional view taken substantially along line IV—IV of Figure 2.

As shown on the drawings:

In the embodiment of my invention illustrated in the drawings, a friction clutch 10 is shown, which may be a selectively engageable torque transmitting means for driving a driven shaft 11 from a gear 12, herein shown as being a bevel gear mounted coaxially of said shaft, although not necessarily such a gear, nor arranged in the specific relationship shown.

The bevel gear 12 is shown as being splined on a sleeve 14 coaxial with the shaft 11 and formed integrally with a clutch housing 15. Said sleeve is journaled in a gear housing 16 for the bevel gear 12 on a ball bearing 17, shown as being mounted in an end plate 18 for said gear housing. The sleeve 14 is journaled on the shaft 11 on a bearing 19, herein shown as being a sleeve bearing. A lock nut 21 and lock washer 22 are provided on the end of said sleeve to lock said bevel gear to said sleeve. The bevel gear 12 is shown as being driven by a bevel gear 23 journaled within the gear housing 16 and suitably driven from a motor (not shown) in any well known manner.

The clutch housing 15 includes a cylindrical portion 25, herein shown as being integrally connected with the sleeve 14 by means of an end wall 26. The cylindrical portion 25 of the clutch housing 15 terminates into an open ended portion 27 of a larger diameter than the portion 25, having an end plate 29 secured to the open end thereof, as by cap screws 30, 30. The end plate 29 has an outwardly projecting cylindrical guide portion 31, closed by an end cap 32, and with said end cap forms a closure for the end of the clutch housing. Said guide portion of said end plate forms a guide for an operating member 33 for the clutch. Said operating member is of a generally cylindrical formation opening to the outside of the clutch and having an inner wall 37, having an inwardly extending boss 38 encircled by a spring 34, seated on said inner wall at one end and seated at its opposite end in the bottom of an inwardly dished generally cylindrical cup 35 of a pressure applying member 36. The pressure applying member 36 is operable to exert or relieve pressure from a plurality of alternately arranged driving and driven friction disks 39 and 40 of the clutch, as will hereinafter more clearly appear as this specification proceeds.

The cap 32 is rotatable about a shaft 42, mounted therein for slidable movement with respect thereto. The shaft 42 has a reduced diameter inner end portion 43 journaled within the cylindrical wall of the operating member 33, on an anti-friction bearing 44. A rod 45 is shown as extending inwardly from the shaft 42 through the center of the boss 38 and through the inner end wall of the pressure applying member 36, and as being slidably movable with respect thereto. A nut 46 is threaded on the inner end of the rod 45 to limit outward movement of the shaft 42 with respect to the end plate 29. An outwardly opening recess 49 is provided in the end of the shaft 11 to receive the nut 46 and the inner end of the rod 45.

The means for applying pressure to the pressure applying member 36 through the spring 34 to engage the clutch disks 39 with the clutch disks 40 is herein shown as including a fluid pressure cylinder 50 having a piston 51 slidably movable therein, with a piston rod 52 slidably guided in the piston rod end of said cylinder and extending therefrom. The cylinder 50 has an ear 53 extending rearwardly from its head end. An arm 54, herein shown as extending laterally and forwardly from the end plate 18 of the gear housing 16 forms a support for said arm on a pivot pin 55.

A spring 57 is contained within the cylinder 50 and interposed between the head end thereof and the head end of the piston 51, to urge said piston outwardly of the cylinder 50. A pressure passageway 59 leads to the piston rod end of the cylinder 50 to supply fluid under pressure thereto, and to move said piston against the spring 57 in a direction to tend to compress the spring 34 and apply pressure to the pressure applying member 36, as will hereinafter more clearly appear as this specification proceeds.

The outer end of the piston rod 52 is shown as being flattened and as having two arms 60 abutting opposite sides of the flattened portion thereof and pivotally connected thereto, on a pivotal pin 61. The arms 60, 60 extend transversely of the clutch housing 15 and are pivotally connected at their opposite ends to the free end of the reaction link 62 by means of a pivotal pin 63. The opposite end of the reaction link 62 is pivoted to an arm 64 on a pivotal pin 65. The arm 64 is like the arm 54 and projects laterally and forwardly from the end plate 18 of the gear housing 16. The arms 60, 60 are connected intermediate their ends by a connecting member 66, herein shown as being a pin pivotally connected to said arms 60, 60 and extending through a reduced end portion 67 of the shaft 42.

It is obvious from the foregoing that when fluid under pressure is supplied to the piston rod end of the cylinder 50, the shaft 42 will be moved inwardly to exert a clutch-engaging pressure on the pressure member 36 through the compression spring 34, and that when fluid under pressure is relieved from the piston rod end of said cylinder the spring 57 will move the shaft 42 in a reverse direction to relieve pressure from the spring 34 and pressure applying member 36, and release the clutch.

A stop 67 is provided to limit inward movement of the piston 51 along the cylinder 50, and thus to limit the deflection of the spring 34. Said stop is herein shown as being a machine screw, threaded in a block 69, connected between the arms 60, 60. A lock nut 70 is provided to retain said stop in position in said block. The head of said machine screw is adapted to abut an ear 71 projecting laterally from the head end of the cylinder 50 when the piston 51 is at the full end of its inward travel with respect to the cylinder 50. The position of said stop may be adjusted in an obvious manner to vary the pressure applied to the spring 34 and the amount of deflection thereof. Under normal operating conditions there may be very little distortion of the spring 34 when the clutch is engaged, so as to allow full movement of the pressure applying member 36 against said spring when the clutch is released, due to overload conditions thereon, as will now be described.

The means for releasing the clutch disks 39 from the clutch disks 40 upon predetermined overload conditions on the shaft 11 includes an axially floating engaging ring 85, engaged at one end by an annular engaging surface 72 of the pressure applying member 36, and engaging a ring 80 at its opposite end. The ring 80 has a plurality of engaging pins 79, 79 secured thereto and extending inwardly therefrom through a flanged portion 76 of a clutch sleeve 75 into engagement with an end clutch disk 81. The end disk 81 is herein shown as abutting a clutch disk 39, and as being splined on the clutch sleeve 75 on external splines 74, 74. The clutch disks 39, 39 are shown as being splined on internal splines 73 formed integrally with the interior of the cylindrical portion 25 of the clutch housing 15. The alternately arranged clutch disks 40, 40 are shown as being splined to the exterior splines 74, 74, which are formed integrally with the clutch sleeve 75 and serve to rotatably drive said sleeve when the friction disks 39 and 40 are in engagement with each other. The end disk 81 is like the disks 40, 40, but is somewhat thicker, to take the clutch engaging loads without distortion.

The flanged portion of the clutch member 76 is herein shown as having a ring or cylindrical driven member 77 secured thereto, as by welding and encircling the engaging ring 85. Said driven member forms a driving means for the clutch. Clearance is provided between outer periphery of said ring or cylindrical member 77 and the inside of the enlarged portion 27 of the clutch casing to allow said casing to freely rotate with respect to said ring, when the clutch is disengaged.

The floating ring 85 spaced inwardly of the ring or cylindrical portion 77 of the clutch member 76 also encircles a ring or enlarged diameter cylindrical portion 88 of a driven clutch member 86, keyed on the end of the shaft 11, and serving as a drive member for said shaft. The driven clutch member 86 is shown as being in the form of a sleeve, journaled within the sleeve portion 75 on a bearing member 87, which may be a bearing sleeve, pressed within the sleeve portion 75.

The drive from the ring 77 to the ring or enlarged diameter portion 88 of the driven clutch member 86 includes the intermediate floating clutch-engaging ring 85, against which the drive reaction is exerted, to tend to move said ring axially against the pressure applying member 36 and compression spring 34, in a direction to disengage the clutch, when the reaction exerted on said clutch engaging ring overbalances the force exerted thereon by the compression spring 34.

A cylindrical ball retainer 89 is interposed between the ring 77 and the engaging ring 85. The retainer 89 is shown in Figures 2, 3 and 4 as having three sets of aligned balls 90, 90, of three each carried thereby and arranged 120° apart and extending in straight lines in the direction of the axis of rotation of said rings. The balls 90, 90 roll in axially extending races 91, 91 formed in the interior of the ring 77 of the clutch member 76 and in corresponding axially extending races 92, 92 formed in the exterior of the engaging member 85.

In a like manner, a retainer 93 is interposed between the engaging ring 85 and the enlarged diameter portion or driven ring 88 of the driven sleeve 86. The retainer 93 carries three sets of balls 94, 94 of three each arranged to deviate from axial alignment in angular or helical paths. Each set of balls is shown in Figures 3 and 4 as being spaced 120° apart and alternately arranged with respect to the balls 90, 90. The balls 94, 94 ride in helical races 95 and 96 extending across the inner periphery of the engaging ring 85 and the outer periphery of the driven ring 88. The helix angle of the races 95 and 96 may vary, depending on the load conditions for which the clutch is designed and the desired sensitivity of the clutch, an average helix angle found satisfactory for relatively heavy duty loads being a deviation of 10° from a line extending along the face of the ring 88 parallel to the axis of rotation of said ring.

The races for the sets of balls 90, 90 are thus straight and aligned and extend in the direction of the longitudinal axis of the clutch while the races for the sets of balls 94, 94 follow angular, or helical paths, the angle of which may vary according to the particular operating conditions of the clutch and the desired sensitivity in its operation.

The drive to the driven shaft 11 is thus through the driving ring 77, the balls 90, 90 in the transversely extending axially aligned parallel races 91 and 92, the clutch engaging ring 85, and the balls 94, 94 in the helical races 95 and 96 driving the driven ring 88 and sleeve 86. The drive to the engaging member 85 will thus be a positive drive from the ring 77, but will allow said engaging member to freely move axially of said driving ring. The drive from clutch engaging ring 85 to the driven ring 88 will be such that as the engaging member rotates in a direction which in Figures 3 and 4 is shown as being a clockwise direction, an axial reaction will be set up against said engaging ring 85 to urge said engaging ring to move outwardly against the pressure applying member 36 and the spring 34.

When the reactive force set up against the ring 85 is sufficient to overbalance the force exerted by the spring 34, the engaging ring 85 will move away from the friction disks 39 and 40 and release pressure on said disks, and allow the clutch to slip until the overload conditions are relieved. At this time, the spring 34 again engages the disk 39 with the disk 40 to drive the shaft 11 from the clutch housing 15, clutch sleeve 75 and driving and driven rings 77 and 88, through the axially floating ring 85, as just described.

In operation of the clutch, when it is desired that the shaft 11 be disconnected from the gear 12 and remain stationary, pressure is released from the cylinder 50. The spring 57 then moves the operating shaft 42 to its outer position through the arms 60, 60. The casing 15 is then free to rotate with respect to the shaft 11. When it is desired to engage the clutch to drive the shaft 11, pressure is supplied to the piston rod end of the cylinder 50 to move the piston 51 against the spring 57 and move the operating shaft 42 and operating member 33 inwardly of the end plate 29. This will apply pressure to the pressure member 36 through the spring 34 and will move the engaging ring 85 inwardly along the balls 90, 90 and 94, 94 to engage the clutch disks 39 and 40 with each other. The shaft 11 will then be rotatably driven from the casing 15 through the disks 39 and 40, driving ring 77, the balls 90, 90 in the axially extending races 91 and 92, the engaging member 85 and balls 94, 94 in the angularly extending or helical races 95 and 96. The shaft 11 will thus be driven from the clutch casing 15, and during driving of this shaft, there will always be a tendency for the engaging member 85 to move outwardly against the spring 34 in a direction to release the disks 39 and 40 from each other. When the load on the shaft 11 is such that the reaction tending to force the engaging member 85 in a direction to release the clutch overbalances the outer force of the compression spring 34, the engaging member 85 will move outwardly against said spring and allow the disks 39 and 40 to slip. As soon, however, as the overload conditions are released the spring 34 will again move the pressure applying member 36 and engaging ring 85 in a direction to engage the plates 39 with the plates 40.

It may be seen from the foregoing that the engaging ring 85, which is axially moved by the balls 94, 94 in the helical races 95 and 96, is floatingly mounted between the rings 77 and 88 on the respective balls 90, 90 and 94, 94 to move along the axis of the shaft 11, and since the engaging ring 85 is floatingly mounted on balls, the frictional resistence tending to resist axial movement of said engaging ring is reduced to a minimum. An anti-friction mounting for the engaging member has thus been provided, enabling release of the clutch without taking into account frictional resistance against the engaging or release member, and the loads at which the clutch releases may be varied by varying the loading and strength of the spring 34, or varying the angular relation of the helical races with respect to the axis of the shaft 11, or both. A simple and efficient torque-limiting clutch has, thus, been provided wherein the loads at which the clutch will release may be accurately determined and maintained.

It will be understood that modifications and variations may be effected without departing from the scope of the novel concepts of the present invention.

I claim as my invention:

1. A torque-limiting clutch comprising a driving member, a driven member, releasable clutch means for driving said driven member from said driving member, an axially movable engaging ring having operative connection with said clutch means to engage the same, a pressure applying member engageable with said engaging ring, spring means engageable with said pressure applying member and loaded to bias said pressure applying member and engaging ring to engage said clutch means, means reacting against said engaging ring, pressure applying member and spring means and tending to move said engaging ring and pressure applying member against the bias of said spring means in a direction to release the clutch including two spaced rings concentric with and in alignment with said engaging ring, one encircling said engaging ring and being rotated by said driving member through said releasable clutch means, and the other being encircled by said engaging ring and driving said driven member, and driving connections between said rings including said engaging ring, one of said driving connections exerting a direct rotatable thrust on said engaging ring and the other of said driving connections exerting an angular thrust against said engaging ring, urging said ring to move against the bias of said spring means in a direction to relieve pressure from said clutch means and disengage the clutch.

2. In a torque-limiting friction clutch, friction clutch means including at least two friction clutch members and an annular engaging member having engaging connection with one of said clutch members and applying pressure against said clutch members to hold said clutch members in engagement with each other, a ring member driven by one of said clutch members and encircling said engaging member, a driven member encircled by said engaging member, a pressure applying member engageable with said engaging member, a spring seated on said pressure applying member, means reacting against said spring and loading said spring to bias said pressure applying member and engaging member to move along the axis of rotation thereof in a direction to engage said friction clutch members, said engaging member being floatingly mounted between said ring member and said driven member for movement in the direction of the axes thereof, drive connections between said ring member and said engaging member, other drive connections between said engaging member and said driven member, one of said drive connections reacting against said engaging member in a direction to rotatably drive said engaging member, and the other of said drive connections reacting against said engaging member in a direction to move said engaging member along its axis against the bias of said spring.

References Cited in the file of this patent

UNITED STATES PATENTS

| Number | Name | Date |
|---|---|---|
| 1,789,862 | Bricken | Jan. 20, 1931 |
| 1,969,698 | Lyman | Aug. 7, 1934 |
| 2,086,954 | Fawick | July 13, 1937 |
| 2,182,926 | Manz et al. | Dec. 12, 1939 |
| 2,314,227 | Lieberherr | Mar. 16, 1943 |
| 2,355,202 | Cartlidge | Aug. 8, 1944 |
| 2,455,435 | Nader et al. | Dec. 7, 1948 |
| 2,480,212 | Baines | Aug. 30, 1949 |
| 2,530,904 | Ofeldt | Nov. 21, 1950 |
| 2,619,815 | Nardone | Dec. 2, 1952 |

FOREIGN PATENTS

| Number | Country | Date |
|---|---|---|
| 93,162 | Germany | Aug. 16, 1897 |
| 620,306 | Germany | Sept. 26, 1933 |